United States Patent
Winterowd et al.

(10) Patent No.: US 12,325,596 B2
(45) Date of Patent: Jun. 10, 2025

(54) METHOD OF COMPOSITE PANEL DETACHMENT FROM A HEATED AND COOLED PRESS

(71) Applicant: CONTINUUS MATERIALS INTELLECTUAL PROPERTY, LLC, The Woodlands, TX (US)

(72) Inventors: Jack G. Winterowd, Puyallup, WA (US); Matthew Spencer, Palatine, IL (US); Marko Suput, Lompoc, CA (US); Mya Fisher, Ames, IA (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 179 days.

(21) Appl. No.: 18/300,540

(22) Filed: Apr. 14, 2023

(65) Prior Publication Data

US 2024/0217754 A1    Jul. 4, 2024

Related U.S. Application Data

(60) Provisional application No. 63/437,022, filed on Jan. 4, 2023.

(51) Int. Cl.
*B65G 45/24* (2006.01)
*B08B 1/50* (2024.01)
*B65G 45/12* (2006.01)
*B65G 45/18* (2006.01)
*B65G 45/22* (2006.01)

(52) U.S. Cl.
CPC ............ *B65G 45/24* (2013.01); *B65G 45/12* (2013.01); *B65G 45/18* (2013.01); *B65G 45/22* (2013.01); *B65G 2201/022* (2013.01)

(58) Field of Classification Search
CPC ........ B65G 45/24; B65G 45/12; B65G 45/18; B65G 45/22; B65G 2201/022; B65G 43/00; B27N 3/24; B27N 3/18; B29C 2043/585; B29C 33/72; B29C 43/32; B29C 43/58; B08B 3/022; B08B 7/0071; B08B 1/34; B08B 1/165; B08B 1/20; B08B 1/50; B08B 1/12
USPC .......................................................... 198/494
See application file for complete search history.

(56) References Cited

U.S. PATENT DOCUMENTS

| | | | | |
|---|---|---|---|---|
| 2005/0109580 A1* | 5/2005 | Thompson | ............ | B65G 45/24 |
| | | | | 198/495 |
| 2007/0181233 A1* | 8/2007 | Ritzen | ...................... | C23G 5/00 |
| | | | | 148/633 |
| 2013/0104709 A1* | 5/2013 | Rother | ...................... | B26D 7/32 |
| | | | | 83/100 |

FOREIGN PATENT DOCUMENTS

| | | | | |
|---|---|---|---|---|
| DE | 202014000978 U1 * | 9/2014 | ............ | B65G 45/22 |
| EP | 4082796 A1 * | 11/2022 | ............... | B08B 1/12 |
| FR | 2697514 A1 * | 5/1994 | ............ | B65G 45/14 |

(Continued)

OTHER PUBLICATIONS

Foreign Search Report on EP DTD May 24, 2024.

*Primary Examiner* — Gene O Crawford
*Assistant Examiner* — Muhammad Awais
(74) *Attorney, Agent, or Firm* — FOLEY & LARDNER LLP (57) ABSTRACT

A method of maintaining a belt of a continuous press configured to compress a mat comprising plastic elements includes applying a cleaning tool to the belt to remove plastic residue from the one or more plastic elements that has adhered to the belt and combusting the residue that accumulates on the cleaning tool.

18 Claims, 8 Drawing Sheets

(56) References Cited

FOREIGN PATENT DOCUMENTS

| | | | | | |
|---|---|---|---|---|---|
| JP | 2018004207 | A | * | 1/2018 | |
| JP | 2020019258 | A | * | 2/2020 | ............ B41J 11/007 |

* cited by examiner

METHOD OF COMPOSITE PANEL DETACHMENT FROM A HEATED AND COOLED PRESS

BACKGROUND

Effective and environmentally sound waste disposal is a common dilemma faced by most industrialized and developing nations. In recent history, waste has primarily been disposed of in landfills, which require substantial tracts of land that might otherwise be used for other meaningful purposes. Regulatory and political bodies, as well as generators of waste, are increasingly interested in reducing waste volumes, diverting waste from landfills and incinerators while promoting more sustainable usage of waste products. Unfortunately, despite efforts of governments and communities to institute and promote waste recycling programs, there remains a tremendous amount of recyclable material that is not recycled.

There is a critical need to utilize this vast resource and at the same time save the land now occupied as landfill space. It is therefore desirable to develop technologies that not only reduce the amount of waste destined for a landfill or incinerator, but also to capture and use such material for beneficial purposes

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Current solutions to reducing the amount of waste stored in landfills or burned in incinerators often involve converting the waste into a useful product. For instance, in one example, the waste may be captured, melted, and congealed into a composite board comprising a mixture of the captured waste. If the composite board is properly melted and congealed, the composite board may be capable of being exposed to outdoor elements (e.g., sun, rain, snow, sleet, temperature changes, heat, cold, etc.) for prolonged time periods without any substantial deformations. Construction companies may use such composite boards to build roofing and/or side paneling for houses or large buildings. Thus, instead of taking up space in landfills that are increasingly overflowing, waste may be manipulated by manufacturers into a composite board that can benefit many different types of consumers (e.g., homeowners, companies working in offices, warehouse owners, etc.).

One sample process for manufacturing composite boards is described in U.S. patent application Ser. No. 17/069,567, filed Oct. 13, 2020, the entirety of which is incorporated by reference herein. This process generally involves forming a mat comprised of fragments. In some cases, the fragments are a mixture of discrete paper fragments (e.g., cellulosic fragments) and/or or plastic fragments (e.g., thermoplastic polymer fragments). In other cases, each fragment is comprised of separate layers of paper and thermoplastic polymer. The mat may include paper/plastic fragments sandwiched between top and bottom layers (e.g., facer layers). These top and bottom layers may include paper, fiberglass, films, and/or other nonwovens or facer fabrics. Typically, thermoplastic adhesive layers are positioned between the paper/plastic fragment-based core and the top and bottom surface layers. The mat may be assembled in a relatively cold state and the spatial order of the components may be mostly preserved throughout the subsequent thermal processing steps. The moisture content of the mat can range from about 0-25%. The mat is first subjected to a hot-pressing step under conditions that compress the mat and melt a significant portion of the thermoplastic polymer, especially fragments made of polyethylene. In a subsequent step, the hot mat may be subjected to a cold-pressing step under conditions that simultaneously maintain the compressed state of the mat and congeal (e.g., freeze) the molten thermoplastic in the mat.

In some systems, a mat of paper and plastic may be continuously deposited onto a moving conveyor belt and moved through one or more continuous presses, rather than inserting a stationary mat of paper and plastic into a stationary press (e.g., a single-opening press) and then lowering and raising the press. Each continuous press may include a continuous belt moving at approximately the same speed as the conveyor belt such that the mat of paper and plastic is continuously fed into and pressed by the belts. The belts may be made of steel or other similar materials that can be heated to a high temperature. In some cases, the mat may be pressed by a heated belt to melt the plastic in the mat, and then pressed by an unheated or cold belt to resolidify the plastic in the mat. The hot press may include continuous heated belts, usually made of steel, above and below the mat that are heated to temperatures as high as about 420 degrees Fahrenheit. Because of the high temperature of the heated belts, melted plastic that comes into direct contact with the belts may burn and stick onto the belts, which makes removal difficult and may create surface imperfections on any subsequently made board. In some cases, a single belt may be heated at a first end and cooled at a second end, such that the single belt can function as both a hot press and a cold press. When the melted plastic is cooled, for example, in a cooling press or in a cool region of a heating and cooling press, the melted plastic can congeal and strongly bind to the belt of the press.

While facer layers positioned above and below the paper and plastic mat may provide separation between the heated belts and the plastic of the mat, certain facer materials, such as nonwoven fiberglass, may be porous enough that some plastic may seep through the facer and come into contact with the heated belts. In addition to damaging the belts, the finished boards themselves can be damaged due to burnt plastic sticking to the facers. Further, due to the width of the conveyor belt and hot press, many commercially available facer materials may not be wide enough to cover the entire mat. In some cases, it may even be desirable to include gaps in the facer materials to allow for steam to more easily escape from the mat. However, any exposed portions of the mat coming into contact with the heated belts may cause melted plastic to stick to the belts. Further, the facer materials themselves may contain additives, such as bonding resins, which are used to adhere the glass fibers together. When maintained at certain elevated temperature values for certain periods of time, these resins can thermally degrade into compounds that can stick to the surface of the heated belt. The bonding resins may be, for example, acrylic resins, amino resins, or mixtures of acrylic resins and amino resins.

In a sustained manufacturing operation, sufficient molten plastic and/or degraded bonding resin can accumulate on the belt to cause processing problems, which can include sticking of the mat to the belt, reduced heat transfer rate between the belt and the mat, damage to the outer surface layer of the board, and irregular telegraphed indentations on the panel surface after pressing.

Thus, there is a need to provide a method of preventing the buildup of molten plastic and/or degraded bonding resin on the belts or removing the buildup before accumulation becomes a problem. In the manufacturing of composite wood boards, chemical release agents may be applied to the wooden mats, and/or to the heated belts, and/or transport screens, and/or stationary hot platens to prevent sticking. While these release agents are effective in preventing fouling of the belts or platens, they can discolor the wood boards or interfere with the ability of the boards to bond to other materials using adhesives. However, composite wood boards are often sanded after being pressed to control the thickness and the surface finish of the completed board. The sanding process removes any release agents that are transferred from the heated belts to the surface of the composite wood board, so the temporary surface discoloration caused by the release agents is typically not a problem. In contrast, it may not be required or desired to sand the outer surfaces of the plastic composite boards described herein, in order to preserve the appearance and material properties of the outer layers of the boards. If release agents are applied to the plastic composite boards for pressing and remain on the outer surfaces of the boards when manufacturing is complete, the release agents may interfere with any use of the plastic composite board in the field that requires the use of adhesives, including roofing applications. For example, traditional release agents may adversely impact the ability of the finished panel to bond strongly to membranes or other adherends using adhesives such as polyurethanes, acrylics, mastics, vinyl acetates, or other adhesive compositions Accordingly, there is a need for a process that prevents plastic and/or degraded bonding resin from sticking to the belts and/or a process for removing the plastic and/or degraded bonding resin from the belts before the belts or composite plastic boards are damaged, and which does not adversely affect the material properties or appearance of the finished boards.

In the embodiments described herein, built up material on the belts may be mechanically removed by, for example, a scraper blade or rotary cleaning tool. The material collected by the scraping blade or rotary cleaning tool may be combusted by one or more burners. The scraping blade or rotary cleaning tool may continuously remove material from the continuous belt, while the burners may operate continuously or periodically. In some embodiments, a combustible cleaning fluid may be applied to the belt before the material is scraped or cleaned from the belt to further aid in combusting the built-up material on the scraping blade or rotary cleaning tool. In some embodiments, a combustible or non-combustible cleaning fluid may be applied as a pressurized jet of fluid to assist in loosening material that has accumulated on the belt. In some embodiments, a combustible release agent may be applied to the belt to prevent plastic and/or degraded bonding resin from sticking to the belt. The combustible release agent and/or combustible cleaning fluid may be combusted by the burner along with the accumulated material on the scraper blade or rotary cleaning tool. In some embodiments, a scraper blade or rotary cleaning tool may not be used, and the belt may be subjected directly to a burner or a laser, which may remove built-up material on the belt.

Figure 1:
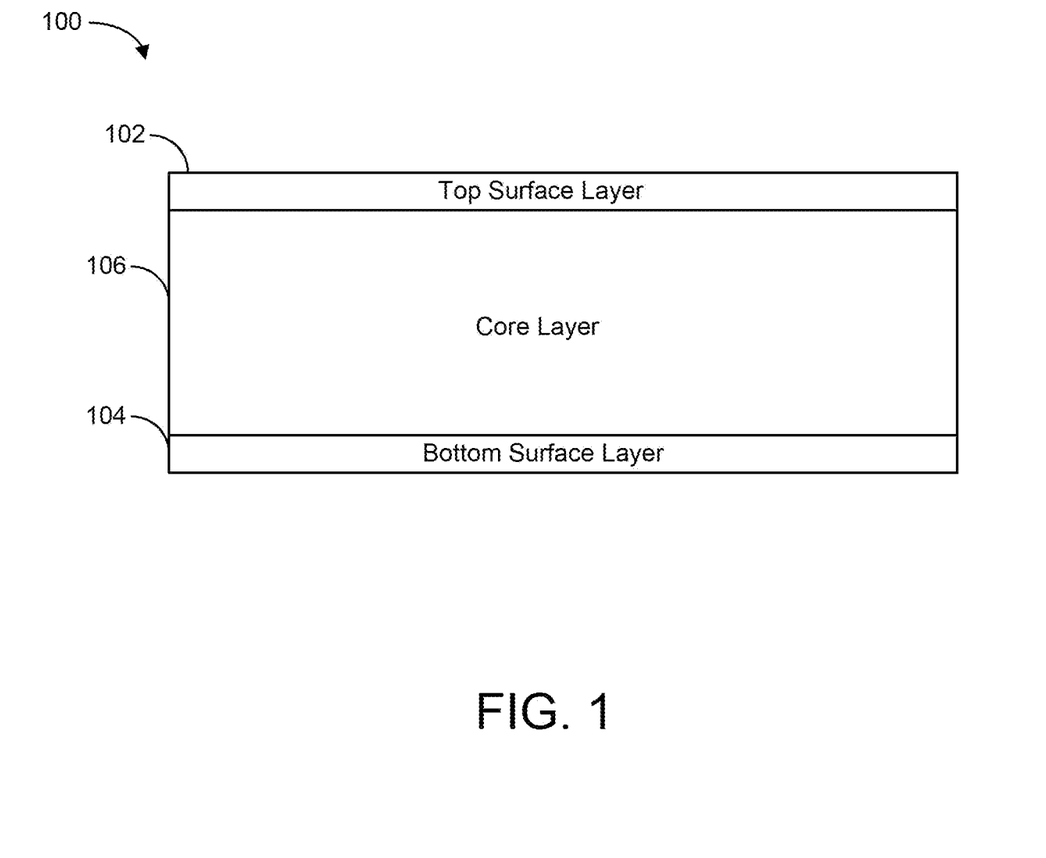
FIG. 1 is an example composite mat, in accordance with some embodiments of the present disclosure.

Referring now to FIG. 1, an example composite board 100 is shown, in accordance with some embodiments of the present disclosure. Composite board 100 may be manufactured to operate as a roof cover board that can provide impact protection (from hail, foot traffic, and/or heavy equipment), temporary water resistance, fire resistance, wind-uplift constraint, thermal dimensional stability, and/or flexibility that is often required in roofing applications. Composite board 100 may be manufactured such that mechanical fasteners can be used to couple composite board 100 to other components (e.g., a wood frame) and/or such that adhesives can be used to adhere other components to the outer surfaces of composite board 100.

The composite board 100 may comprise three discrete layers, a top surface layer 102, a bottom surface layer 104, and a core layer 106. The top surface layer 102 and the bottom surface layer 104 may be made from glass fiber fabrics, including glass fiber nonwoven mat. The top surface layer 102 and bottom surface layer 104 may also comprise paper, including kraft paper and synthetic polymer films or nonwovens, especially those having a melt-point greater than about 300 degrees Fahrenheit, such as nylon, polyester, and certain polyether-based films or nonwovens. In some embodiments, the top surface layer 102 and the bottom surface layer 104 may be somewhat porous, such that molten thermoplastic material in the core layer 106, under conditions of heat and pressure, is able to pass therethrough. The molten thermoplastic material may adhere to the belts of the continuous presses used to heat and compress the board 100 during manufacturing. In some embodiments, the top surface layer 102 and the bottom surface layer 104 may be about 0.005-0.100 inches thick.

The core layer 106 may be about 0.100-1.500 inches thick and may comprise discrete cellulosic elements and plastic elements, which may be connected using a thermoplastic bonding resin, such as polyethylene. The cellulosic and plastic elements may be in the form of small pieces called fragments. The plastic elements may include a mixture of thermoset plastics, which do not melt, and thermoplastics. In some embodiments, at least one of the thermoplastic materials may have a melting temperature that is higher than the temperature of the heated belts used to heat and compress the board 100 during manufacturing. Thermoplastic elements can include polyethylene, polypropylene, copolymers of ethylene and propylene, polystyrene, acrylonitrile, styrene butadiene resins, and plasticized polyvinyl chloride. The size and shape of the plastic elements can vary substantially. However, in most cases, the size of the plastic elements will be less than that of the eventual composite panel that is being manufactured. Core layer 106 may be manufactured by heating and cooling a mat of discrete paper fragments and plastic fragments while applying pressure to the mat. The heat may melt the thermoplastic fragments, which then resolidify upon cooling.

Plastic fragments may be comprised of polypropylene, polystyrene, polyester, nylon, rubber (natural and synthetic), polyvinyl chloride, polyethylene (including LLDPE, LDPE, MDPE, HDPE), copolymers of ethylene and propylene, and other commercial plastics. Polyethylene based plastics, especially low and medium density polyethylene resins, may be used. The plastic fragments may be a mixture of different types of polymers. In addition to polymers, the core layer 106 can also contain plasticizers, such as dioctyl phthalate or benzyl butyl phthalate, colorants, stabilizers, preservatives, and other functional additives. Plastic fragments may be produced by milling larger pieces of plastic. The plastic may be recycled or sourced from waste streams (films, packaging, or a wide array of plastic articles). Generating plastic fragments from waste or recycling streams has the advantage of being low cost and helps to sustainably reduce waste, which is a worldwide problem. The plastic fragments may vary in thickness and/or diameter.

The core layer 106 may also include cellulosic elements. Cellulosic elements can include wood, cotton, grass (including bamboo), pulp fibers derived from various plants, rayon fibers, cellulose esters and other derivatives, paper, and other cellulose-based materials. The size and shape of the cellulosic elements can vary substantially, however, in most cases, the size of the cellulosic elements will be less than that of the eventual composite panel that is being manufactured. Cellulose elements may include paper fragments. Paper fragments may be made by milling larger pieces of paper until the disintegrated material passes a screen with a particular mesh size. Paper subjected to the milling process may be newspaper, advertising, office paper, packaging, old corrugated cartons, or other paper products. The paper may be recycled or sourced from waste streams. Generating paper fragments from waste or recycling streams has the advantage of being low cost and helps to sustainably reduce waste, which is a worldwide problem. The paper fragments may vary in thickness and/or diameter. In some embodiments individual fragments could contain both paper and plastic. For example, many packaging materials found in waste streams are comprised of a plurality of alternating paper and plastic layers. In some cases, these packaging materials may also include a layer of aluminum foil or a film that has been metalized on one surface. Fragments derived from all these materials may be suitable for embodiments of this disclosure.

In some embodiments, composite board 100 may include a layer of thermoplastic adhesive between the core layer 106 and each surface layer 102, 104. The thermoplastic adhesive may bond the surface layers 102, 104 to the core when the board is heated and cooled. In some embodiments, the core layer 106 may include multiple layers of discrete paper fragments and plastic fragments.

The structure of composite board 100 may be designed to achieve compression load support, sudden impact resistance, wind uplift resistance, fastener retention, adhesive compatibility, temporary rain protection, low flame spread, thermal dimensional stability, and an exceptional level of mechanical flexibility. The design promotes rapid and easy installation of the cover board in a commercial low slope roof application. It may be especially advantageous in re-roofing applications due to its level of flexibility, which may allow it to more easily conform to the curved contour of the perimeter region of the roof. The upper (when installed) outer surface of the board may allow for the absorption of adhesives but may temporarily resist transfer of rainwater into the core layer of the board.

Figure 2A:
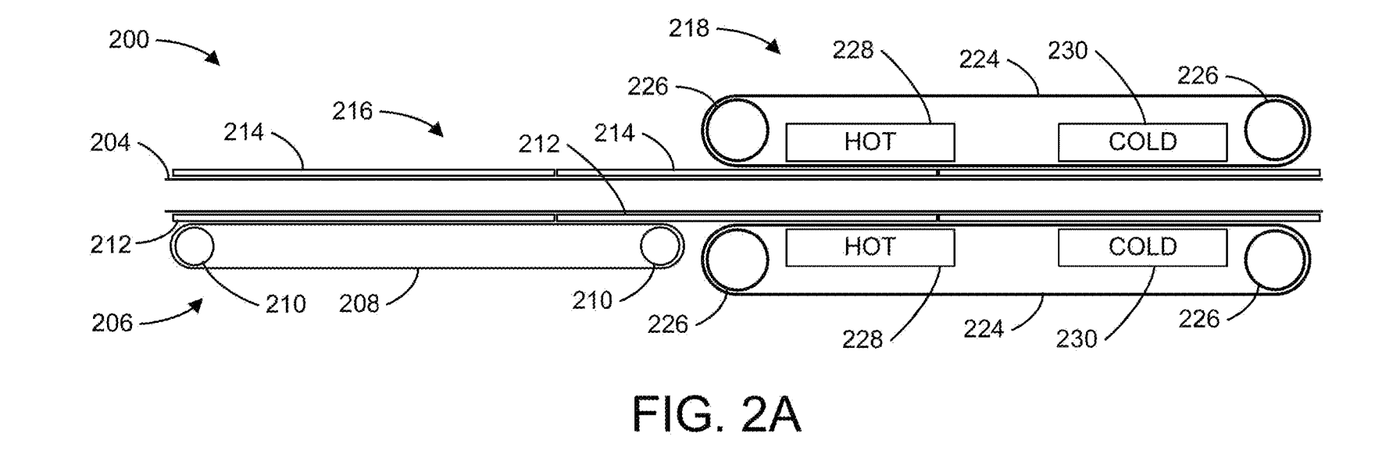
FIGS. 2A and 2B are side view illustrations of a composite board manufacturing system, in accordance with some embodiments of the present disclosure.
Figure 2B:
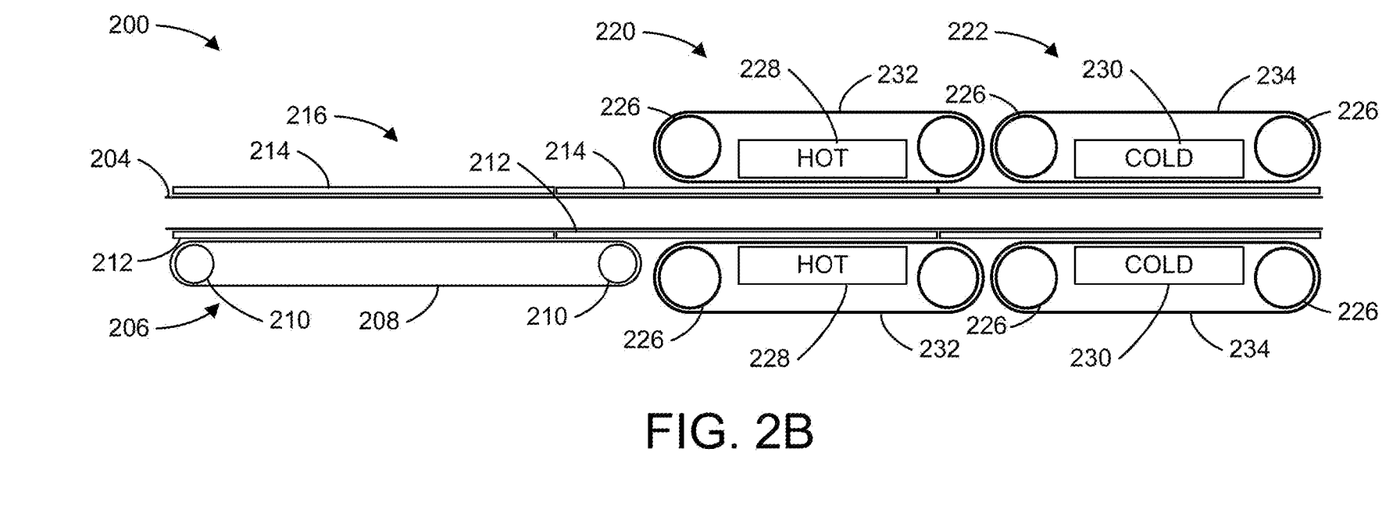

Referring now to FIGS. 2A and 2B, a composite board manufacturing system 200 is shown, in accordance with some embodiments of the present disclosure. It should be understood that the various components of the composite board manufacturing system 200 are not to scale. Further, certain components in the system, including mat forming and board cutting components, are not shown. Composite board manufacturing system 200 may include a forming bin configured to receive a mixture of plastic and paper and to dispense a continuous mat 204 of paper and plastic onto a conveyor system 206. The continuous mat 204 may be heated, cooled, pressed, and cut to form the core layer 106 of the composite board 100. The conveyor system 206, may include one or more belts 208 arranged end to end, each belt 208 travelling around two or more rollers 210. One or more of the rollers 210 may be driven, for example, by a motor or engine. The conveyor system 206 moves the continuous mat 204 through the various stages of manufacturing of the composite board 100. As used herein, the term "downstream" refers to the direction that the conveyor system 206 moves the continuous mat 204, and the term "upstream" refers to a direction opposite the direction that the conveyor system 206 moves the continuous mat 204. Lower facers 212 may be inserted under the continuous mat 204 such that the lower facers 212 are positioned between the continuous mat 204 and the conveyor belt 208. In some embodiments, the lower facers 212 may be positioned on the conveyor system 206 upstream of the forming bin, such that the continuous mat 204 is deposited directly onto the lower facers 212. Upper facers 214 may be positioned on top of the continuous mat 204 to form a composite sandwich 216 including the continuous mat 204 sandwiched between the lower facers 212 and the upper facers 214. Thus, when the continuous mat 204 is hot-pressed, cooled, and cut, a lower facer 212, or a portion of a lower facer 212, may form the bottom surface layer 104 of the composite board 100, and the upper facer 214, or a portion of the upper facer 214, may form the top surface layer 102 of the composite board. In some embodiments, only the upper facers 214 or only the lower facers 212 may be added, such that the finished composite board 100 does not include either a top surface layer 102 or a bottom surface layer 104. In some embodiments, the mat of paper and plastic that is pressed to form the core layer 106 may not be continuous. For example, the core layer 106 material may be deposited on to the conveyor belt 208 with periodic interruptions if needed for manufacturability.

After the lower facers 212 and/or the upper facers 214 are positioned respectively underneath and on top of the continuous mat 204, the conveyor system 206 may move the composite sandwich 216 to one or more presses 218, 220, 222 (e.g., composite board manufacturing presses). The presses 218, 220, 222 may heat and/or cool and compress the composite sandwich 216. As shown in FIG. 2A, a combined press 218 may perform both hot pressing and cold pressing. The combined press 218 may include a combined belt 224 traveling around two or more rollers 226 in a continuous circuit above the composite sandwich 216 and a combined belt 224 below the composite sandwich 216. The combined press may include heating elements 228 (e.g., one or more hot platens) followed downstream by cooling elements 230 (e.g., one or more cold platens) both above and below the composite sandwich 216. As shown in FIG. 2B, the system 200 may instead include a separate hot press 220 with hot belts 232 followed downstream by a cold press 222 with cold belts 234. The heating element (e.g., a resistive heating element, an inductive heating element, etc.) may be placed in contact with or in proximity to the heated belt 232 to heat the heated belt 232 to the desired temperature. For example, a resistive heating element may be positioned between the upper and lower segments of each heated belt 232 or adjacent the segment of the heated belt 232 not in contact with the composite sandwich 216. In some embodiments, one or more of the rollers 226 may include heating elements, and heat may be transferred from the rollers 226 to the heated belts 232. The system 200 may include temperature sensors to measure the temperatures of the belts 224, 232, 234. The measurements can be used to control the heating elements to maintain the belts 224, 232, 234 at the desired temperatures.

One or more of the rollers 226 of each belt 224, 232, 234 may be driven, for example, by a motor or engine. In some embodiments, the belts 224, 232, 234 may be made of steel. The hot belt 232 or the hot portion of the combined belt 224 may be heated to a temperature in the range of about 350 degrees Fahrenheit to about 420 degrees Fahrenheit. The belts 224, 232, 234 and rollers 226 may function similarly to the conveyor system 206, with the rollers 226 being configured to drive the belts 224, 232, 234 moving the composite sandwich 216 continuously through the presses 218, 220, 222. The hot belt 232 or the hot portion of the combined belt 224, the heating elements 228, and the rollers 226 apply heat and high pressure to melt the plastic in the continuous mat 204 and compress the composite sandwich 216. In some embodiments, the composite sandwich 216 may only be heated from above or below, with the other side of the composite sandwich 216 not being heated. The cold belt 234 or the cold portion of the combined belt 224, the cooling elements 230, and the rollers 226 cool the composite sandwich 216 under high pressure to re-solidify the plastic in the continuous mat 204. In some embodiments, the composite sandwich 216 may only be cooled from above or below, with the other side of the composite sandwich 216 not being cooled. As discussed above, plastic from the continuous mat 204 that comes into contact with the heated belts 224, 232 may melt and stick onto the hot belts 232 or the combined belt 224. When the heated belts 224, 232 move around the circuit away from the heating element, plastic stuck to the belts 224, 232 can resolidify and bond strongly to the belts 224, 232. Plastic from the mat 204 that is melted by the hot belt 232 may also transfer from the mat 204 to the cold belt 234. When the cooling element 230 of the combined press 218 or the cold press 222 cools the plastic that sticks to the combined belt 224 or the cold belt 234, the plastic may bond even more strongly to the belts 224, 234. The accumulation of plastic on the belts 224, 232, 234 can cause damage to the belts 224, 232, 234 and can affect the quality of the finished composite board 100.

Figure 3:
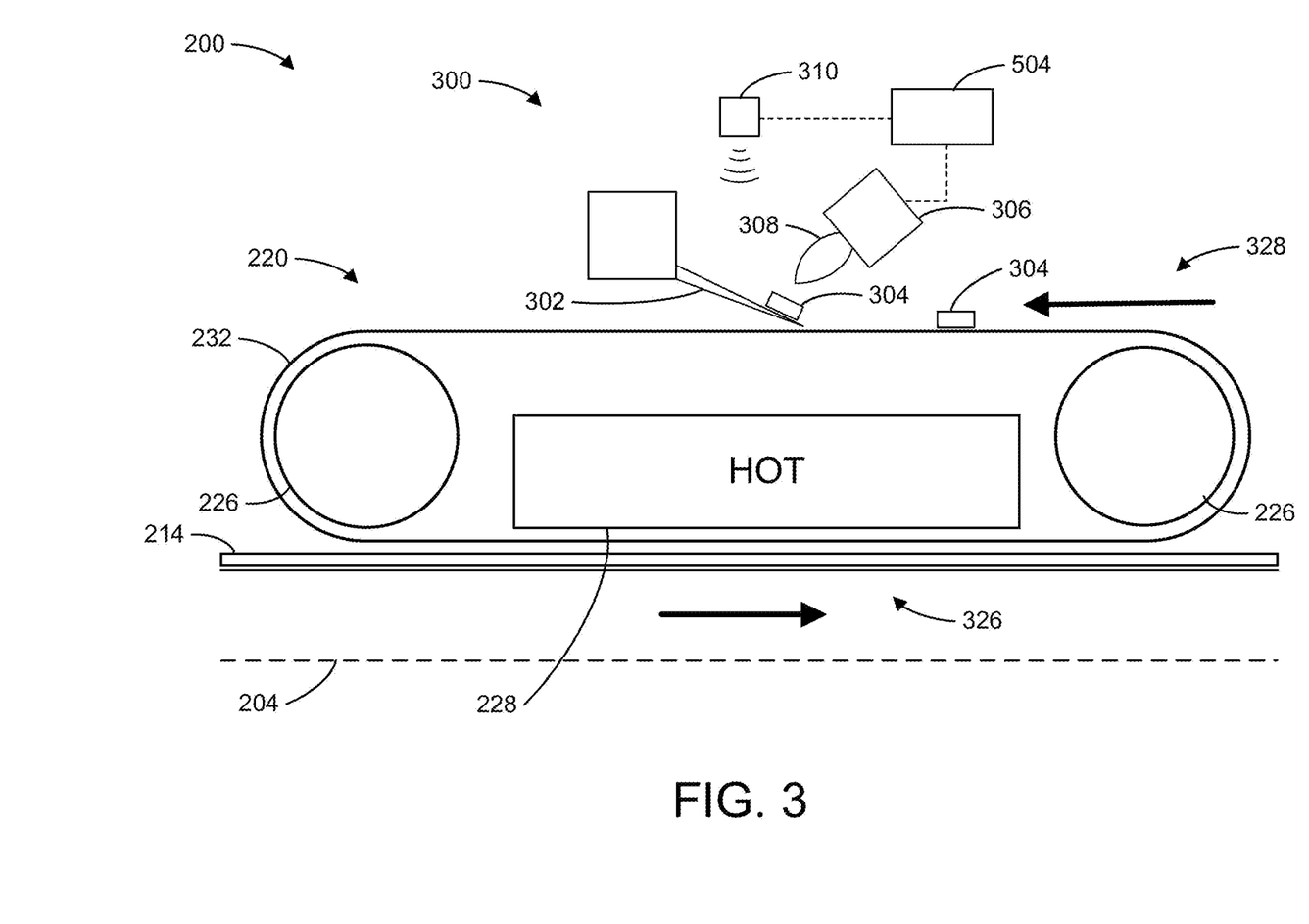
FIGS. 3-6 are side view illustrations of a portion of a composite board manufacturing system including a belt cleaning system, in accordance with some embodiments of the present disclosure.

Referring now to FIG. 3, a portion of the composite board manufacturing system 200 is shown, including a belt cleaning system 300, according to some embodiments. For simplicity, only the upper half of a hot press 220 (and the upper half of the composite sandwich 216) is shown, but it should be understood that the embodiments of the belt cleaning system 300 disclosed herein may be utilized to clean any of the upper and lower hot belts 232, cold belts 234, or combined belts 224. As shown in FIG. 3, the composite sandwich 216 may move from left to right, and the hot belt 232 may move in a counterclockwise circuit around the rollers 226. The lower part of the circuit, between the two rollers 226, where the belt 232 contacts the composite sandwich 216, may be referred to as the mat contact zone 326, which begins at the lower left and ends at the lower right of the hot press 220. The upper part of the circuit where the belt 232 does not contact the composite sandwich 216 may be referred to as a non-contact zone 328, which begins at the lower right and ends at the lower left.

In some embodiments, the belt cleaning system 300 may include a fixed scraper blade 302 (e.g., a doctor blade, a cleaning tool, etc.) configured to remove material 304 (e.g., residue, contaminant, etc.) that has adhered to the belt 232. The fixed scraper blade 302 may be mounted in place to continuously scrape the non-contact zone 328 of the belt 232 to remove the material 304. As discussed above, the material may include plastic from the continuous mat 204, degraded bonding resin from the facers 212, 214, and/or any other material in the composite sandwich or contaminant in the system 200 that adheres to the belt 232. The scraper blade 302 may be mounted at an angle such that the end of the blade 302 may lift the material 304 from underneath, fully separating the material 304 from the belt. The scraper blade 302 may be made of metal, for example, steel, tungsten, or other materials with high melting points. In some embodiments the scraper blade 302 may be made of a material softer than the belt 232, such that the scraper blade 302 does not cause excessive wear on the belt 232. For example the belt 232 may be made of steel, and the scraper blade 302 may be made of a metal material softer than steel, such as bronze or aluminum. The scraper blade 302 may apply downward pressure to the belt 232 such that a desired amount of scraping force may be applied. In some embodiments, the vertical position and/or the angle of the scraper blade 302 may be adjustable such that the applied scraping force and angle can be adjusted. In the non-contact zone 328, increasing the downward force on the belt 232 may cause the belt 232 to deflect downward and increase the tension on the belt 232. Thus, the scraper blade 302 may also be used as a belt tensioner. In some embodiments, the belt 232 may be maintained at a temperature above the melting point of the material 304 (e.g., one or more of the plastic elements or the mat 204 or other contaminants), such that any portion of the contaminant that sticks to the belt 232 may remain in a molten state when it reaches the scraper blade 302 or other cleaning tool for more effective removal.

The scraper blade 302 may be the same width or wider than the belt 232, such that the entire surface area of the outer surface of the belt 232 is scraped each time the belt 232 completes a circuit around the rollers 226. In some embodiments, multiple scraper blades 302 may be used. For example, in some embodiments, two or more scraper blades 302 may be used in series, such that the entire width of the belt 232 is scraped twice or more each time the belt 232 completes a circuit around the rollers 226. The subsequent blades 302 may remove any material 304 from the belt that is not removed by the previous blades 302. In some embodiments, multiple blades 302 that do not scrape the entire width of the belt 232 may be used. For example, a first scraper blade 302 may scrape the left half of the belt 232; then a second scraper blade 302 may scrape the right half of the belt 232. Any combination of scraper blades 302 of various widths positioned in the non-contact zone 328 are contemplated. In some embodiments, a scraper blade may be positioned adjacent the rollers 226, rather than in the non-contact zone 328.

As the scraper blade 302 removes material 304 from the belt 232, the material 304 may begin to accumulate on the scraper blade 302. In some embodiments, the belt cleaning system 300 may include a burner 306 configured to combust the material on the scraper blade 302. The burner 306 may be, for example, a torch, an open flame, a jet of ignited flammable material (e.g., kerosene, methane), etc. The burner 306 may apply a flame 308 to the scraper blade 302 at a temperature high enough to combust the accumulated material 304. The temperature of the flame 308 and/or the combustion temperature of the material 304 may be between about 600 degrees Fahrenheit and about 5000 degrees Fahrenheit, or between about 600 degrees Fahrenheit and about 1200 degrees Fahrenheit. In some embodiments, the temperature of the flame 308 may be kept below the melting temperature of the scraper blade 302 and/or other components of the system 200. Higher flame 308 temperatures may promote more rapid and complete combustion of the accumulated material 304. In some embodiments, multiple burners 306 may be used to sufficiently cover the entire scraper blade 302 or scraper blades 302 to ensure complete combustion of the material 304. For example, a first burner 306 may apply a first flame 308 to the left side of the blade 302, and a second burner 306 may apply a second flame 308 to the right side of the blade 302. The burner 306 may function continuously, periodically, or based on a detected level of material 304 on the scraper blade 302. For example, the burner 306 may continuously apply a flame 308 to the scraper blade 302 such that material 304 is immediately burned off of the scraper blade 302 before any significant accumulation occurs. In some embodiments, a scraper blade 302 may not be used, and a continuous or periodic flame 308 may be applied directly to the belt 232 by the burner 306.

In some embodiments, the flame 308 may be applied to the scraper blade 302 according to a predetermined schedule. For example, the flame 308 may be applied for two consecutive minutes followed by a ten-minute period during which the flame 308 is not applied. The on/off intervals may be determined based on an expected amount of accumulated material 304 on the belt 232. The amount of time the flame 308 is applied may be sufficient to completely combust all the material 304 that accumulates on the blade 302 during the period the flame 308 was not applied, plus all the material 304 that is scraped during the period that the flame 308 is applied. For example, it may be determined that the scraper blade 302 is expected to collect 10 grams of material 304 per minute, and that the burner 306 has the capacity to combust 50 grams of material per minute. The burner 306 may be operated for two minutes of each ten-minute interval of time, such that all the material 304 is removed from the blade 302 without burning excess fuel. More frequent, shorter periods of flame 308 application may be preferable to longer, less frequent periods, as a thick layer of material 304 may be more susceptible to charring and incomplete combustion. If the belt cleaning system 300 is used on the cold belt 234 of the cold press 222, applying the flame 308 periodically rather than continuously may also reduce the amount of heat applied to the cold belt 234, which can reduce the cooling demand on the cooling elements 230.

In some embodiments, the burner 306 may be operated based on a detected amount of material 304 on the scraper blade 302 and/or the belt 232. The belt cleaning system 300 may include one or more sensors 310 configured to detect the material (e.g., an amount of material). For example, the sensor 310 may be an optical sensor configured to optically detect material on the blade 302 and/or the belt 232. In some embodiments, the sensor 310 may be a weight sensor configured to determine a weight of the material 304 accumulated on the blade. The burner 306 may be activated (e.g., may apply the flame 308) when the detected amount of material meets or exceeds a predetermined threshold. For example, if the sensor 310 is weight sensor, the burner 306 may be activated when the weight of material on the blade 302 exceeds a predetermined weight (e.g., 100 grams). If the sensor 310 is an optical sensor, the burner 306 may be activated when the percentage of the upper surface of the blade 302 detected to be covered with material 304 exceeds a predetermined percentage (e.g., 80 percent). Applying the flame 308 only when a detected amount of material 304 exceeds a predetermined value may reduce the amount of fuel used compared to applying a flame 308 continuously or based on a predetermined schedule. A controller 504 may receive measurements from the sensor 310, may determine whether the measurements indicate that the amount of material 304 exceeds the predetermined threshold, and may instruct the burner 306 to apply the flame 308 to the blade 302 based on determining that the amount of accumulated material on the blade 302 exceeds the threshold.

Figure 4:
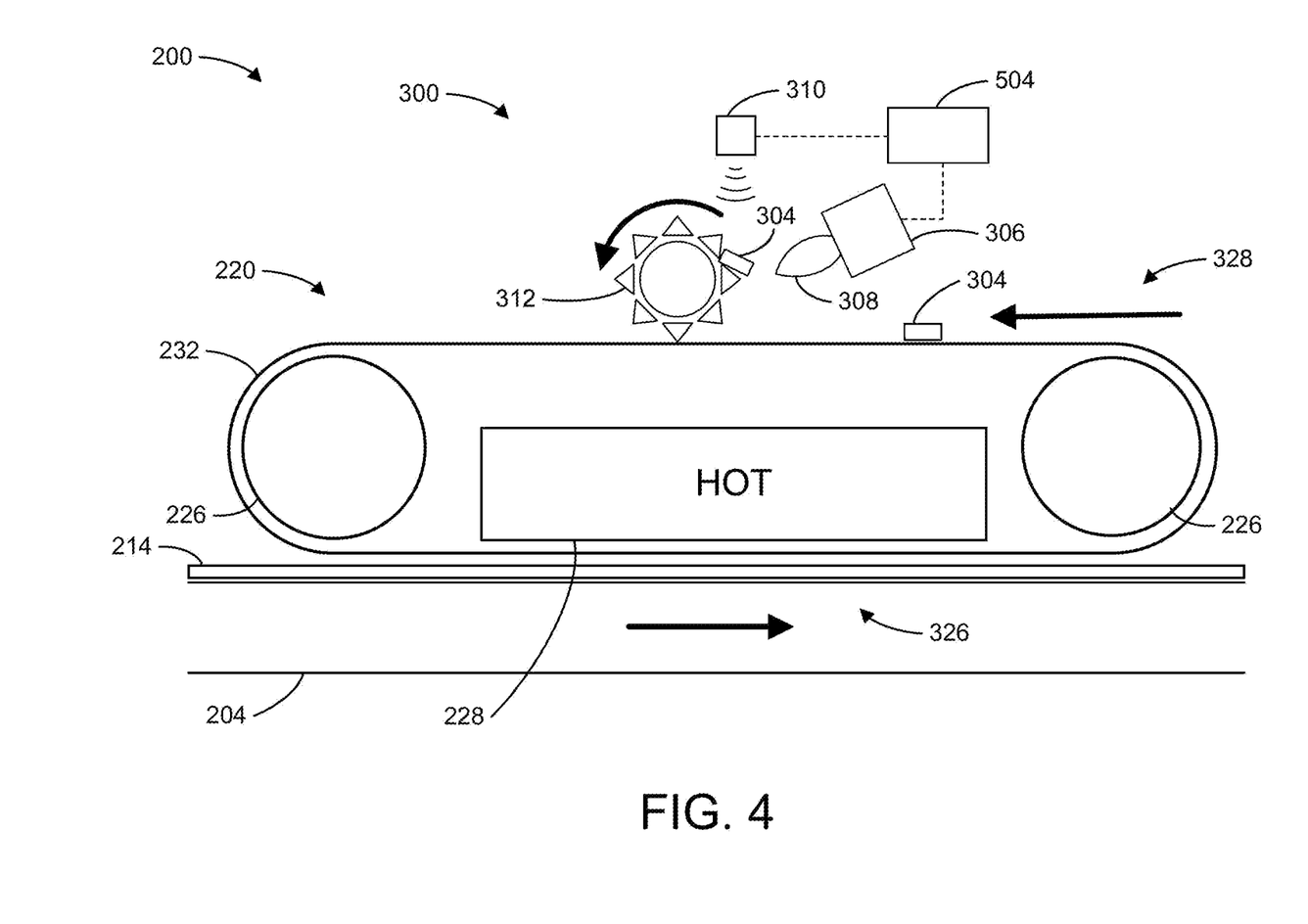

Referring now to FIG. 4, a portion of the composite board manufacturing system 200 is shown, including a belt cleaning system 300, according to some embodiments. In the embodiment shown in FIG. 4, a rotary cleaning tool 312, rather than the scraper blade, 302, is used to remove the material 304 from the belt 232. The rotary cleaning tool 312 may be a substantially cylindrical abrasive brush, such as a wire brush with wires extending from a central axis. The rotary cleaning tool 312 may rotate counterclockwise (as shown in FIG. 4), such that the tool 312 is moving in the opposite direction of the belt 232 where it contacts the belt 232. Pieces of material 304 that adhere to the belt 232 may be trapped by the rotary cleaning tool 312 and removed from the belt 232. Similar to the belt cleaning system 300 of FIG. 3, the belt cleaning system of FIG. 4 may include a burner 306 configured to apply a flame 308 to the rotary cleaning tool 312 to combust the material 304 trapped thereon. The flame 308 may be applied continuously or periodically, or a sensor 310 may be used to detect an amount of material on the rotary cleaning tool 312, and the flame 308 may be applied when the amount of material 304 exceeds a threshold amount. The rotary cleaning tool 312 may be made of steel, tungsten, or other materials with high melting points. In some embodiments the rotary cleaning tool 312 may be made of a material softer than the belt 232, such that the rotary cleaning tool 312 does not cause excessive wear on the belt 232. For example the belt 232 may be made of steel, and the rotary cleaning tool 312 may be made of a metal material softer than steel, such as bronze or aluminum.

Figure 5:
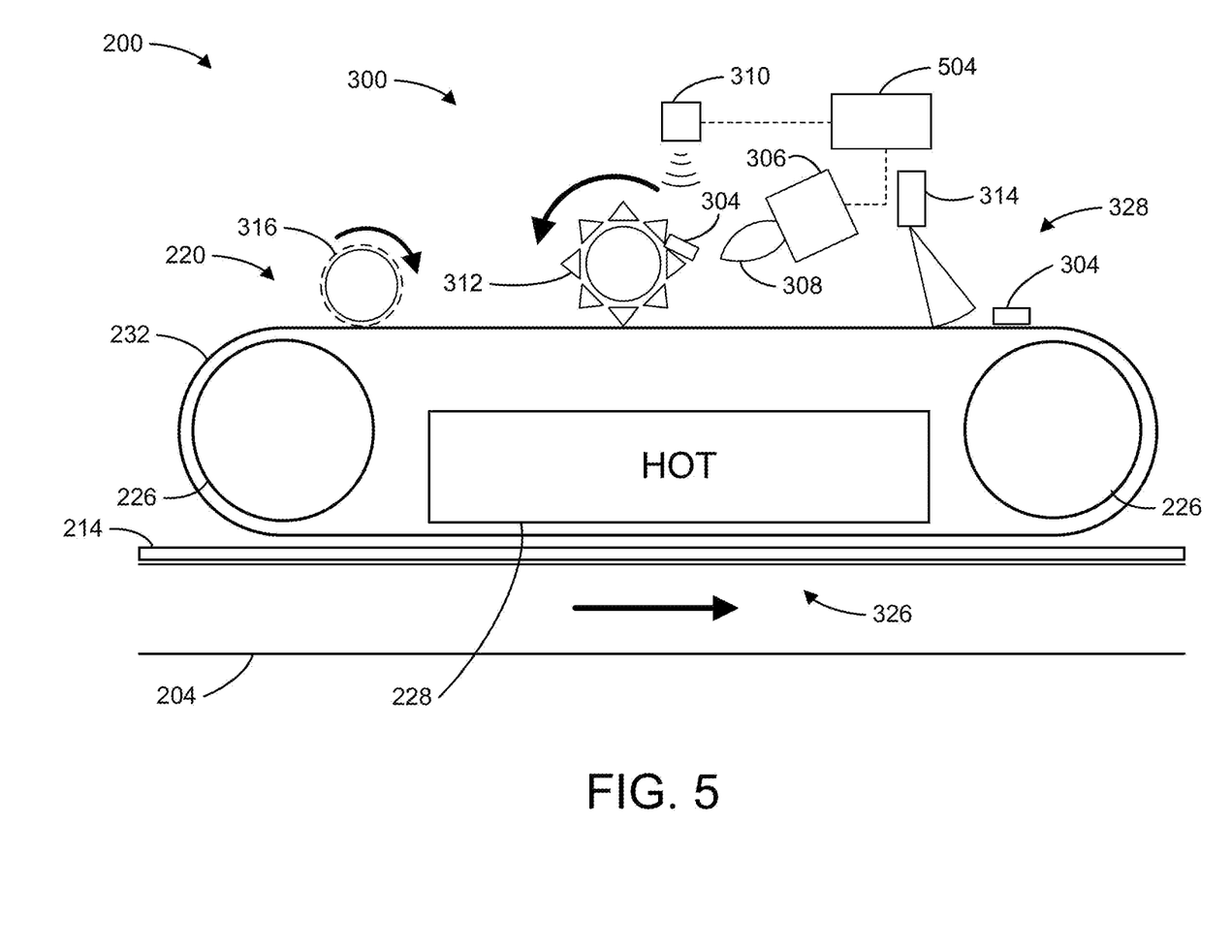

Referring now to FIG. 5, a portion of the composite board manufacturing system 200 is shown, including a belt cleaning system 300, according to some embodiments. The embodiment shown in FIG. 5 may be substantially similar to the embodiment shown in FIG. 4 with additional features to aid in the removal or prevention of material 304 buildup on the belt 232. These additional features may also be included in embodiments incorporating a scraper blade 302, in embodiments in which a flame is applied directly to the belt 232, or alone or in combination with other components of the belt cleaning system 300. The belt cleaning system 300 may include a cleaning fluid applicator 314 configured to apply or dispense a cleaning fluid to the belt 232 between the end of the mat contact zone 236 (e.g., the exit point of the mat 204 from the press 220) and the rotary cleaning tool 312 or scraper blade 302. In some embodiments, the cleaning fluid may be a combustible cleaning fluid. The combustible cleaning fluid may be substantially burned away by the burner 306 when the flame 308 is applied to the rotary cleaning tool 312 or scraper blade 302. For example, the cleaning fluid may be mixed with the material 304 on the tool 312 or blade 302 and/or the flame 308 may ignite combustible cleaning fluid on the belt 232. In some embodiments, the cleaning fluid applicator 314 may be a roll coating machine with a rubber, steel, or a sponge roller applicator and a dispenser configured to dispense the fluid on the applicator. In some embodiments, the cleaning fluid applicator 314 may be a spray system or other type of applicator. In some embodiments, the spray system may be a pressurized jet spray that applies the cleaning fluid with sufficient force or velocity to remove or loosen material 304 from the belt 232. The cleaning fluid applicator 314 may apply between about 1 gram and about 5000 grams of cleaning fluid per 1000 square feet of belt 232. In some embodiments the application of cleaning fluid to the belt might be conducted at points in time when the cleaning tool is not being exposed to flame. In this manner, upstream flame propagation from the flame 308 to the cleaning fluid applicator 314 can be avoided when the cleaning fluid is flammable. The sequencing of these process steps can be achieved with a control system (e.g., controller 504).

The cleaning fluid may help to dissolve and/or soften certain materials 304 on the belt 232. Because the burner 306 may operate periodically or intermittently, some cleaning fluid residue may remain on the surface of finished boards 100 after manufacturing. The cleaning fluid may be selected and be used at low enough concentrations such that the cleaning fluid does not adversely impact the ability of the finished boards 100 to bond strongly to membranes or other adherents using adhesives, such as polyurethanes, acrylics, mastics, vinyl acetates, or other adhesive compositions. Suitable combustible cleaning fluids may include alkane or alkene compounds having about 16 or more carbon atoms. Ester alcohol compounds that have a boiling point greater than about 300 degrees Fahrenheit can also be used as a combustible cleaning fluid. Non-combustible cleaning fluids may include water alone or water with soap or detergent.

In some embodiments, the belt cleaning system 300 may include a release agent applicator 316 configured to apply a release agent to the belt 232 between the rotary cleaning tool 312 or scraper blade 302 and the beginning of the mat contact zone 236 (e.g., an entry point of the mat 204 into the press 220). The release agent may be a combustible release agent, and any combustible release agent that remains on the belt 232 after the belt compresses the composite sandwich 216 may be combusted by the burner 306. The release agent may reduce the amount of material 304 that adheres to the belt 232. This may reduce the needed activation frequency of the burner 306, as less material may adhere to the rotary cleaning tool 312 or scraper blade 302. The release agent may be selected and be used at low enough concentrations such that the release agent does not adversely impact the ability of the finished board 100 to bond strongly to membranes or other adherents using adhesives, such as polyurethanes, acrylics, mastics, vinyl acetates, or other adhesive compositions. Suitable release agents may include fluorinated compounds, silicones, waxes, soaps, water-insoluble salts of fatty acids, and other release agents. In some embodiments, the release agent applicator 316 may be a roll coating machine with a rubber, steel, or a sponge roller applicator. In some embodiments, the release agent applicator 316 may be a spray system or other type of applicator. The release agent applicator 316 may apply between about 1 gram and about 5000 grams of cleaning fluid per 1000 square feet of belt 232.

Figure 6:
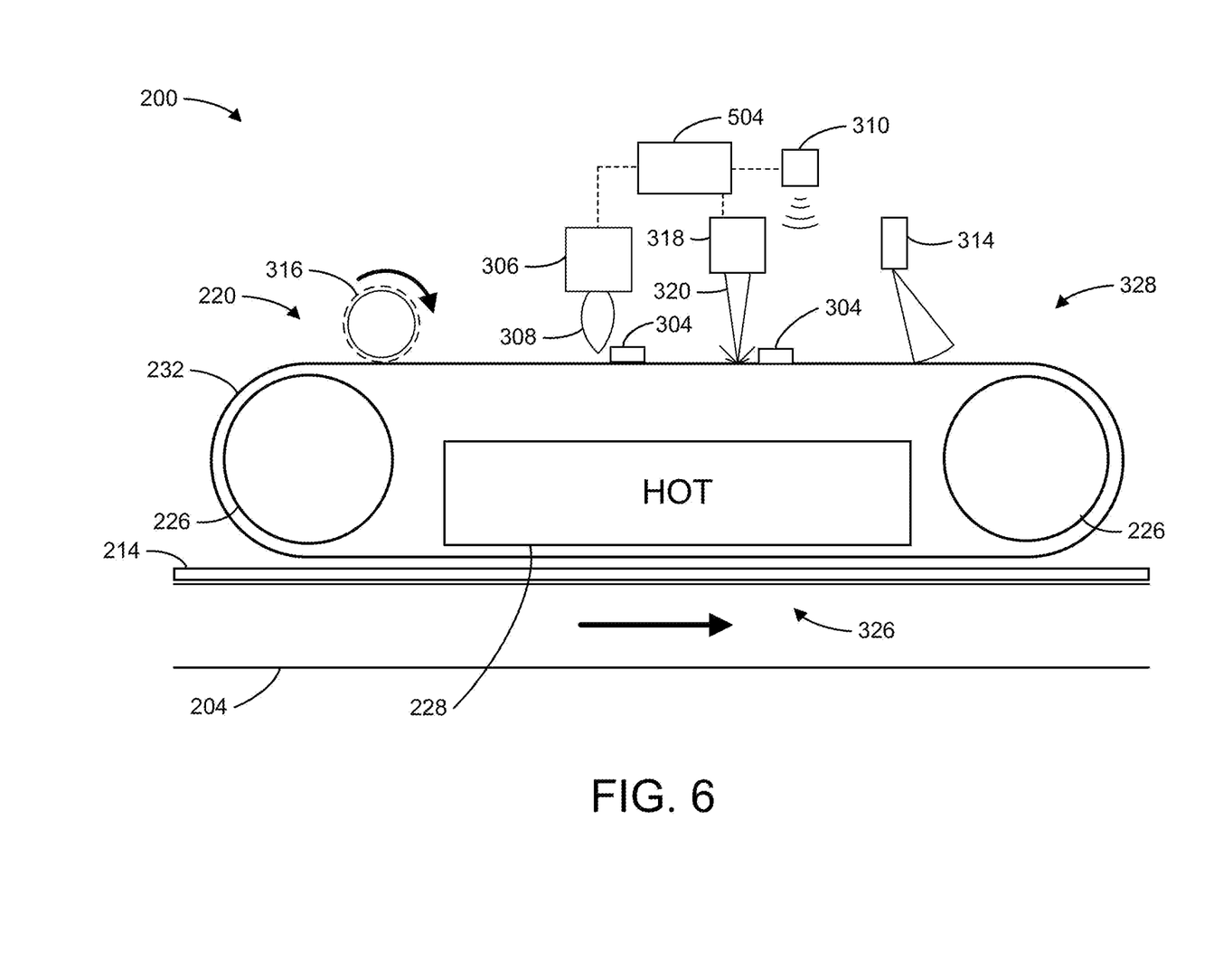

Referring now to FIG. 6, a portion of the composite board manufacturing system 200 is shown, including a belt cleaning system 300, according to some embodiments. The embodiment shown in FIG. 6 may be substantially similar to the embodiment shown in FIG. 5, except that the belt cleaning system 300 may not include a rotary cleaning tool 312 or a scraper blade 302. Instead, the burner 306 may apply the flame 308 directly to the belt 232 to combust any portions of plastic elements or other materials 304 or contaminants on the belt 232. Additionally or alternatively, a laser device 318 may apply a laser 320 to the belt 232 to remove the material 304. The burner 306 or laser device 318 may remove material 304 from the entire width of the belt 232, or additional burners 306 or laser devices 318 may be used. In some embodiments, an optical sensor 310 may detect individual pieces of material 304 and the controller 504 may cause the laser devices 318 or burners 306 to specifically target those pieces rather than applying the laser 320 or flame 308 broadly to the entire belt 232.

Figure 7:
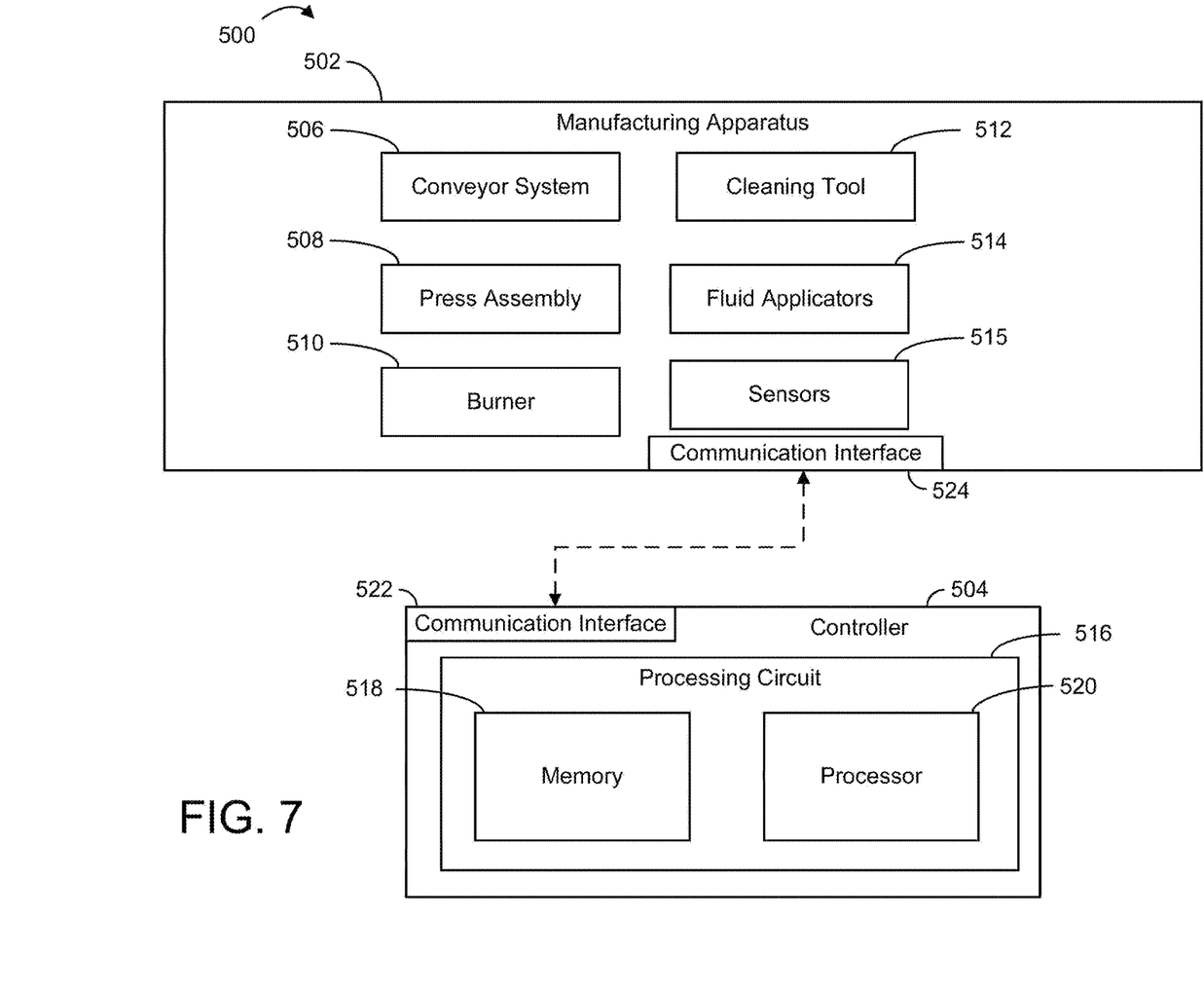
FIG. 7 is a block diagram of a composite board manufacturing system, in accordance with some embodiments of the present disclosure.

Referring now to FIG. 7, a block diagram of a composite board manufacturing system 500 is shown, in accordance with some embodiments of the present disclosure. The composite board manufacturing system 500 may be similar to the composite board manufacturing system 200, shown and described with reference to FIGS. 2-6. The composite board manufacturing system 500 may include a manufacturing apparatus 502 and a controller 504. The controller 504 may be a component of manufacturing apparatus 502 (e.g., a processor and/or display coupled to the manufacturing apparatus 502) or may be external to the manufacturing apparatus 502. The manufacturing apparatus 502 may include a conveyor system 506, a press assembly 508 (e.g., similar to the one or more presses 218, 220, 222), a burner 510, cleaning tool 512 (e.g., similar to the scraper blade 302 or the rotary cleaning tool 312), fluid applicators 514 (e.g., similar to the cleaning fluid applicator 314 and the release agent applicator 316), and sensors 515 (e.g., optical sensors or weight sensors configured to detect material on the cleaning tool 512). Controller 504 may be configured to operate manufacturing apparatus 502 to manufacture composite boards 100. In some instances, controller 504 may receive sensor data from sensors 515 that indicate one or more characteristics of a composite sandwich 216, the cleaning tool 512, or other components of the manufacturing apparatus 502 and adjust the operation of manufacturing apparatus 502 based on the sensor data (e.g., adjust a speed of a conveyor belt of conveyor system 506, a temperature of the belts of the press assembly 508, a frequency of burner 510 activation, etc.).

The controller 504 may include a processing circuit 516 and a communication interface 522. The processing circuit 516 may include a memory 518 and a processor 520, in some embodiments. The processing circuit 516 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. The processor 520 may include an ASIC, one or more FPGAs, a DSP, circuits containing one or more processing components, circuitry for supporting a microprocessor, a group of processing components, or other suitable electronic processing components. In some embodiments, the processor 520 may execute computer code stored in the memory 518 to facilitate the activities described herein. The memory 518 may be any volatile or non-volatile computer-readable storage medium capable of storing data or computer code relating to the activities. According to some embodiments, the memory 518 may include computer code modules (e.g., executable code, object code, source code, script code, machine code, etc.) for execution by the processor 520.

The communication interface 522 may communicate with a communication interface 524 of the manufacturing apparatus 502 via any synchronous or asynchronous network. The communication interface 522 may include one or more communication interfaces that can communicate with the components of the manufacturing apparatus 502. For example, the controller 504 may receive data from the sensors 515 and/or control the conveyor system 506, the press assembly 508, the burner 610, the cleaning tool 512, and the fluid applicators 514 via the communication interface 522. Based on such sensor data and via the communication interface 522, the controller 504 may transmit signals to the manufacturing apparatus 502 or devices (e.g., actuators or controllers) that operate the individual components 506-515 to cause manufacturing apparatus 502 to form a composite sandwich 216 and move the composite sandwich 216 on conveyor system 506 (e.g., by moving a conveyor belt of conveyor system 506) through the press assemblies 508, for example, by controlling the speed of a motor to rotate a roller configured to drive the conveyor belt. Similarly, the controller 504 may control the components of a belt cleaning system (e.g., the burner 510, the cleaning tool 512, the fluid applicators 514).

For example, the controller 504 may receive sensor data from a sensor 515 (e.g., a weight sensor, an optical sensor, etc.) configured to measure an amount of material 304 that has accumulated on a cleaning tool (e.g., a scraper blade, a rotary cleaning tool, etc.). The controller 504 may determine, based on the sensor data, an amount of material 304 accumulated on the cleaning tool 512. The controller 504 may determine whether the amount of material 304 on the cleaning tool 512 exceeds a predetermined threshold. The controller may then send instructions and/or a signal to the burner 510 to activate the burner 510 to combust the material 304 on the tool 512. The controller 504 may also control and adjust an activation pattern of the burner 510. For example, the controller 504 may repetitively activate the burner 510 for two minutes and deactivate the burner 510 for eight minutes. If the controller 504 speeds up the conveyor system 506 and belts in the press assemblies 508, the controller 504 may also increase the frequency of burner activation. By applying the cleaning tool 512 continuously and the burner 510 periodically or intermittently, the system 500 may save energy (e.g., fuel) compared a system in which the burner 510 is operated continuously. The controller 504 may also send signals to control actuators that may adjust the position of the cleaning tool 512 so as to adjust the pressure applied to the belt of the press assembly 508. The controller 504 may send signals to control the rotational speed of a rotary cleaning tool 512. The controller 504 may also send signals to control the application rate of fluid applicators 514. For example, the controller 504 may instruct the fluid applicators 514 to apply more fluid when the belt speed of the press assembly 508 increases.

Figure 8:
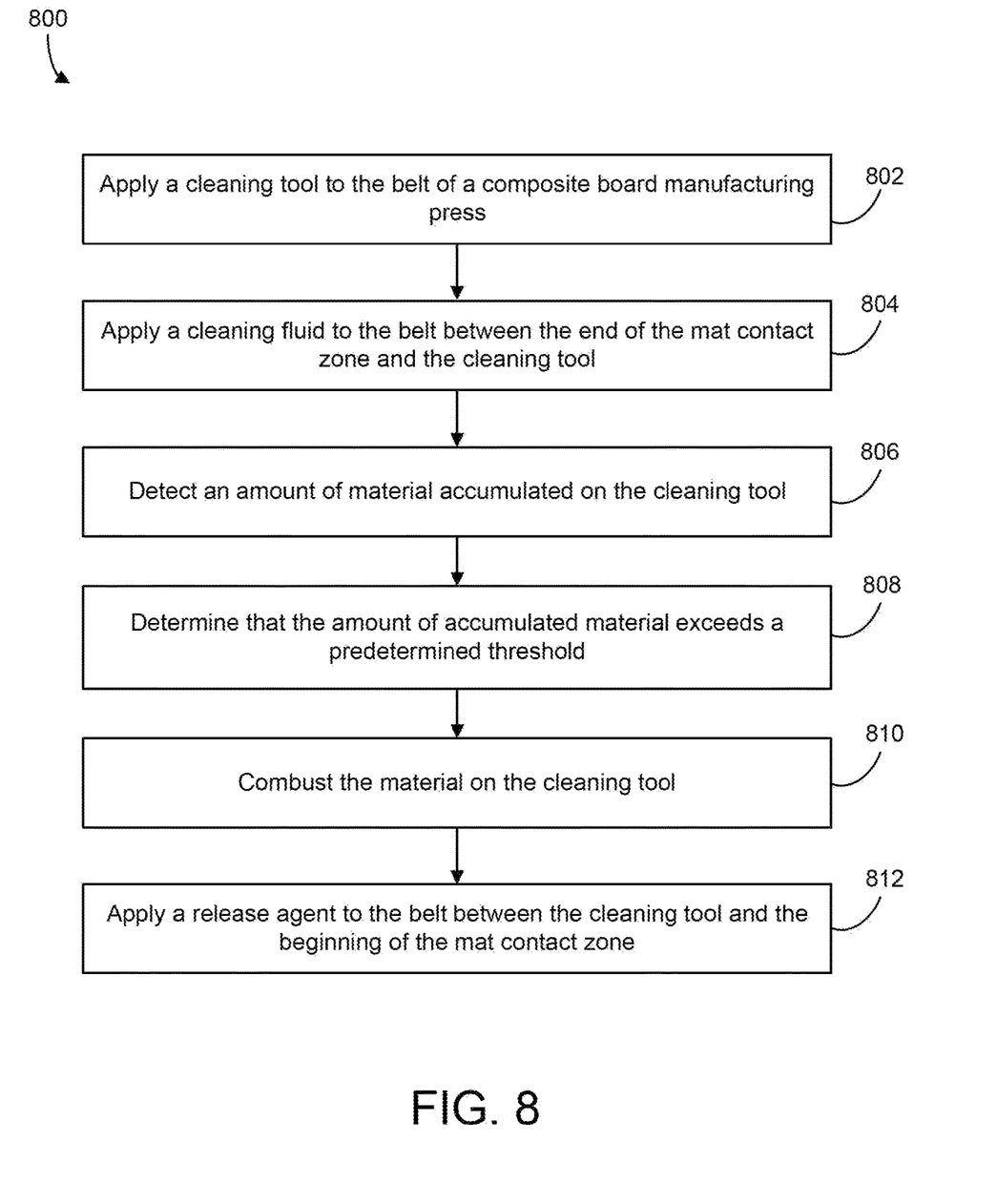
FIG. 8 is a flow diagram of an example process for cleaning the belt of a continuous press in a composite board manufacturing system, in accordance with some embodiments of the present disclosure.

FIG. 8 is a diagram of an example process 800 for cleaning a belt in a composite board manufacturing system, in accordance with some embodiments of the present disclosure. Process 800 can be performed using a composite board manufacturing system (e.g., composite board manufacturing system 200, 500), which may include a controller (e.g., controller 504). Process 800 may include more or fewer operations and the operations may be performed in any order. Performance of process 800 may enable the composite board manufacturing system 200, 500 to manufacture, from waste materials, a composite board 100.

At operation 802 of the process 800, a cleaning tool may be applied to the belt of a composite board manufacturing press to remove material that has adhered to the belt. The cleaning tool may be applied to a non-contact zone of the belt, where the belt does not contact the mat of paper and plastic used to form the composite boards. The cleaning tool may be, for example, a scraper blade or a rotary cleaning tool, such as a wire brush. The rotary cleaning tool may rotate to abrade material from the belt and capture it in the tool (e.g., in the wires of the wire brush). The portion of the brush that contacts the belt may move in the opposite direction of the belt to increase the relative velocity of the brush. The scraper blade may be angled so as to lift material off of the belt and onto the blade.

At operation 804 of the process 800, a cleaning fluid may be applied to the belt between the end of the mat contact zone and the cleaning tool. The cleaning fluid may be a combustible cleaning fluid or a non-combustible cleaning fluid. The cleaning fluid may be applied, for example, using a roll coating device with a rubber, steel, or a sponge roller or using a sprayer. The sprayer may eject cleaning fluid with enough pressure and/or speed to remove or loosen material from the belt.

At operation 806 of the process 800, an amount of material accumulated on the cleaning tool may be detected. For example, a sensor, such as an optical sensor or a weight sensor, may detect material on the cleaning tool and may send signals to a controller. The controller may determine an amount of material on the cleaning tool.

At operation 808 of the process 800, it may be determined that the amount of accumulated material on the cleaning tool exceeds a predetermined threshold. For example, it may be determined, based on data from a weight sensor, that the weight of material on the cleaning tool exceeds a predetermined threshold weight. Alternatively, it may be determined, based on data form an optical sensor, that a percentage of a scraper blade that is covered by material exceeds a predetermined threshold percentage.

At operation 810, the material on the cleaning tool may be combusted. For example, the material may be combusted based on the determination that the amount of accumulated material on the cleaning tool exceeds the predetermined threshold. Alternatively, the material on the cleaning tool may be continuously or periodically combusted. To combust the material, a flame from a burner may be applied to the cleaning tool. The flame may also combust any combustible cleaning fluid and/or combustible release agent that it contacts.

At operation 812, a release agent may be applied to the belt between the cleaning tool and the beginning of the mat contact zone. The release agent may be a combustible release agent. The release agent may reduce the amount of material that adheres to the belt.

In an aspect, a belt cleaning system for a continuous composite board manufacturing press is provided. The system includes a cleaning tool configured to remove material from a belt and a burner configured to combust accumulated material on the cleaning tool.

In some embodiments, the cleaning tool comprises a scraper blade or a rotating brush.

In some embodiments, the burner is configured to periodically or intermittently apply a flame to the cleaning tool to combust the material according to a predetermined schedule.

In some embodiments, the belt cleaning system further includes a sensor configured to detect an amount of material on the cleaning tool and a controller. The controller includes a processor and a non-transitory computer readable storage medium comprising instructions stored thereon that, upon execution by the processor, cause the controller to receive sensor data from the sensor, determine, based on the sensor data, that the amount of material on the cleaning tool exceeds a predetermined threshold, and instruct the burner to apply a flame to the cleaning tool based on determining that the amount of material on the cleaning tool exceeds the predetermined threshold. In some embodiments, the sensor comprises an optical sensor or a weight sensor.

In some embodiments, the belt cleaning tool further includes a cleaning fluid applicator configured to dispense a cleaning fluid on the belt, the cleaning fluid applicator positioned between an end of a mat contact zone and the cleaning tool. In some embodiments, the cleaning fluid applicator comprises a sprayer configured to spray the cleaning fluid directly onto the belt at a velocity sufficient to remove or loosen material adhered to the belt.

In some embodiments, the belt cleaning tool further includes a release agent applicator configured to apply a release agent to the belt, wherein the release agent applicator positioned between the cleaning tool and a beginning of a mat contact zone.

In another aspect, a method of maintaining a belt of a continuous press configured to compress a mat comprising plastic elements is provided. The method includes applying a cleaning tool to the belt to remove plastic residue from the one or more plastic elements that have adhered to the belt and combusting the residue that accumulates on the cleaning tool.

In some embodiments, applying the cleaning tool comprises scraping the belt with a scraper blade or abrading the belt with a rotary brush.

In some embodiments, combusting the residue comprises applying a flame to the cleaning tool. In some embodiments, the flame is applied periodically or intermittently as the belt compresses the mat. In some embodiments, the flame is applied only when an amount of residue accumulated on the cleaning tool exceeds a predetermined threshold.

In some embodiments, the method further includes applying a cleaning fluid to the belt at a position between an exit point of the mat from the press and a location at which the cleaning tool is applied. In some embodiments, the cleaning fluid comprises at least on of an alkane, an alkene, or an ester alcohol. In some embodiments, the cleaning fluid is applied when the cleaning tool is not subjected to a flame. In some embodiments, the method further includes combusting at least a portion of the cleaning fluid while combusting the residue that accumulates on the cleaning tool.

In some embodiments, the method further includes applying a release agent to the belt at a position between a location at which the cleaning tool is applied and an entry point of the mat into the press. In some embodiments, the release agent comprises at least one of a fluorinated compound, a silicone, a wax, a soap, or a water-insoluble salt of a fatty acid.

In another aspect, a method of manufacturing a composite board is provided. The method includes compressing a mat including a core layer comprising plastic elements using a heated belt of a continuous press, wherein at least a portion of the belt is maintained at a temperature above the melting point of at least one plastic element, and one or more portions of the at least one plastic element adheres to the belt. The method further includes exposing the belt to a flame from a burner to combust the portion of the at least one plastic element that adheres to the belt or exposing the belt to a laser to decompose the portion of the at least one plastic element that adheres to the belt.

In some embodiments, the method further includes detecting locations at which the one or more portions have adhered to the belt, wherein exposing the belt to the flame or the laser comprises exposing only the detected locations to the flame or the laser.

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible considering the above teachings or may be acquired from practice of the disclosed embodiments. It is intended that the scope of the invention be defined by the claims appended hereto and their equivalents.

What is claimed is:

1. A belt cleaning system for a continuous composite board manufacturing press, the system comprising:
   a cleaning tool configured to remove material from a belt; and
   a burner configured to apply a flame to the cleaning tool to combust accumulated thermoplastic material on the cleaning tool.

2. The belt cleaning system of claim 1, wherein the cleaning tool comprises a scraper blade or a rotating brush.

3. The belt cleaning system of claim 1, further comprising a controller configured to cause the burner to periodically or intermittently apply the flame to the cleaning tool to combust the material according to a predetermined schedule.

4. The belt cleaning system of claim 1, further comprising:
   a sensor configured to detect an amount of material on the cleaning tool; and
   a controller including a processor and a non-transitory computer readable storage medium comprising instructions stored thereon that, upon execution by the processor, cause the controller to:
   receive sensor data from the sensor;
   determine, based on the sensor data, that the amount of material on the cleaning tool exceeds a predetermined threshold; and
   instruct the burner to apply the flame to the cleaning tool based on determining that the amount of material on the cleaning tool exceeds the predetermined threshold.

5. The belt cleaning system of claim 4, wherein the sensor comprises an optical sensor or a weight sensor.

6. The belt cleaning system of claim 1, further comprising a cleaning fluid applicator configured to dispense a cleaning fluid on the belt, the cleaning fluid applicator positioned between an end of a mat contact zone and the cleaning tool.

7. The belt cleaning system of claim 6, wherein the cleaning fluid applicator comprises a sprayer configured to spray the cleaning fluid directly onto the belt at a velocity sufficient to remove or loosen material adhered to the belt.

8. The belt cleaning system of claim 1, further comprising a release agent applicator configured to apply a release agent to the belt, wherein the release agent applicator positioned between the cleaning tool and a beginning of a mat contact zone.

9. A method of maintaining a belt of a continuous press configured to compress a mat comprising thermoplastic elements, the method comprising:
 applying a cleaning tool to the belt to remove thermoplastic residue from one or more thermoplastic elements that have adhered to the belt; and
 applying a flame to the cleaning tool to combust the thermoplastic residue that accumulates on the cleaning tool.

10. The method of claim 9, wherein applying the cleaning tool comprises scraping the belt with a scraper blade or abrading the belt with a rotary brush.

11. The method of claim 9, wherein the flame is applied periodically or intermittently as the belt compresses the mat.

12. The method of claim 9, wherein the flame is applied only when an amount of residue accumulated on the cleaning tool exceeds a predetermined threshold.

13. The method of claim 9, further comprising applying a cleaning fluid to the belt at a position between an exit point of the mat from the press and a location at which the cleaning tool is applied.

14. The method of claim 13, wherein the cleaning fluid comprises at least on of an alkane, an alkene, or an ester alcohol.

15. The method of claim 13, wherein the cleaning fluid is applied when the cleaning tool is not subjected to the flame.

16. The method of claim 13, further comprising combusting at least a portion of the cleaning fluid while combusting the residue that accumulates on the cleaning tool.

17. The method of claim 9, further comprising applying a release agent to the belt at a position between a location at which the cleaning tool is applied and an entry point of the mat into the press.

18. The method of claim 17, wherein the release agent comprises at least one of a fluorinated compound, a silicone, a wax, a soap, or a water-insoluble salt of a fatty acid.

* * * * *